(12) United States Patent
Schick et al.

(10) Patent No.: US 6,178,067 B1
(45) Date of Patent: Jan. 23, 2001

(54) SIDE EDGE ACCESSIBLE DISK CARTRIDGE SHUTTER LATCH ASSEMBLY

(75) Inventors: Brian Schick, San Diego; Douglas Mayne, Ramona, both of CA (US)

(73) Assignee: Iomega Corporation, Roy, UT (US)

(*) Notice: Under 35 U.S.C. 154(b), the term of this patent shall be extended for 0 days.

(21) Appl. No.: 09/096,954

(22) Filed: Jun. 12, 1998

Related U.S. Application Data

(63) Continuation-in-part of application No. 09/022,342, filed on Feb. 11, 1998, now Pat. No. 5,995,346.

(51) Int. Cl.$^7$ .................................................. G11B 23/33
(52) U.S. Cl. .............................................................. 360/133
(58) Field of Search ............................. 360/133; 369/291

(56) References Cited

U.S. PATENT DOCUMENTS

| Re. 32,876 | 2/1989 | Wakabayashi et al. | 360/133 |
|---|---|---|---|
| 4,614,990 | * 9/1986 | Saito | 360/133 |
| 4,644,434 | 2/1987 | Oishi et al. | 360/133 |
| 4,652,961 | 3/1987 | Dieffenbach | 360/133 |
| 4,695,911 | 9/1987 | Loosen | 360/133 |
| 4,779,159 | 10/1988 | Champagne et al. | 360/133 |
| 4,879,616 | 11/1989 | Ando | 360/99.06 |
| 4,943,880 | * 7/1990 | Muehlhausen et al. | 360/133 |
| 5,260,931 | 11/1993 | Sasaki et al. | 369/291 |
| 5,323,382 | * 6/1994 | Takahashi | 360/133 |
| 5,381,402 | * 1/1995 | Lee et al. | 369/291 |
| 5,481,420 | * 1/1996 | Cardona et al. | 369/291 |

FOREIGN PATENT DOCUMENTS

| 0 077 566 A1 | 4/1983 | (EP) . |
|---|---|---|
| 0 174 111 A2 | 3/1986 | (EP) . |
| 2 161 642 | 1/1986 | (GB) . |
| 2 328 779 | 3/1999 | (GB) . |
| WO 86/06204 | 10/1986 | (WO) . |
| WO 88/09553 | * 12/1988 | (WO) . |

* cited by examiner

*Primary Examiner*—Craig A. Renner
(74) *Attorney, Agent, or Firm*—Woodcock Washburn Kurtz Mackiewicz & Norris LLP

(57) ABSTRACT

A data storage system having a disk cartridge with a rotary inner shell to permit access to a medium is disclosed. The cartridge comprises a latch disposed on an edge of the cartridge for locking the cartridge in a closed position. A flexible lever in the data storage device is adapted to engage and unlock the latch during cartridge insertion. The lever having a spring portion flexes away from the cartridge as it is further inserted into the data storage device.

23 Claims, 13 Drawing Sheets

SIDE EDGE ACCESSIBLE DISK CARTRIDGE SHUTTER LATCH ASSEMBLY

This is a Continuation-In-Part of U.S. patent application Ser. No. 09/022,342 entitled "Cartridge Having a Passive Shutter Opening Mechanism" filed on Feb. 11, 1998, which is hereby incorporated by reference in its entirety, now U.S. Pat. No. 5,995,346, issued Nov. 30, 1999.

BACKGROUND OF THE INVENTION

This invention relates to a cartridge based data storage system in which a flexible magnetic disk is disposed within a cartridge shell. More particularly, the invention relates to a shutter shell latch mechanism for a disk cartridge and data storage device.

Flexible media disk cartridges with rotary shutters have been suggested for a decade or more. For example, a cartridge having a rotary shutter is disclosed in U.S. Pat. No. Re, 32,876 (Wakabayashi et al.). The Wakabayashi patent discloses a disk cassette that contains a flexible magnetic disk for storing information. The disk cassette comprises a flexible disk attached to a hub. The disk and hub assembly are sandwiched between an upper cover and a lower cover. Disk access openings are formed into the top and bottom covers for access by disk drive read/write heads. The Wakabayashi shutter rotates on the interior of the cartridge and comprises a metal sheet that slides over and thereby selectively covers the disk access openings. Such a shutter design may be operable for a flexible disk cartridge in which the media access opening is relatively small, and represents an alternative shutter design to the more common sliding shutter found in 1.44 megabyte floppy disks. For certain disk access openings, a different rotary shutter mechanism from the Wakabayashi shutter may be desirable.

More recently, a rotary shutter that is locked in a closed position has been disclosed. For example, U.S. Pat. No. 5,636,095 (McGrath et al.) describes a rotary shutter that covers a significant percentage of the medium within the cartridge. The McGrath cartridge comprises a hard disk medium that is rotatably disposed within an outer shell. The shutter rotates within the outer shell to selectively expose and cover the medium. The shutter is locked in a closed position. During cartridge insertion, a pivoting arm engages the cartridge unlocking the shutter and rotating it open as the cartridge is inserted in to the drive. The pivoting arm rotates over the same arc as the opening shutter.

There is a need for an improved disk cartridge having a latched shutter shell.

SUMMARY OF THE INVENTION

The present invention is directed to a data storage device that comprises a disk drive and removable cartridge. The cartridge for use with the drive comprises an outer shell having a spindle access opening, a substantially circular magnetic medium rotatably disposed within the outer shell, and a hub connected to the magnetic medium proximate the center of the medium. The cartridge also comprises an inner shell having a spindle access opening and a head access opening. The inner shell is rotatably coupled to the outer shell between first and second positions, and the spindle access openings of the inner and outer shells are substantially aligned. The inner shell is selectively rotatable to the first position so that the head access openings of the inner and outer shells substantially align and the second position so that the head access openings are substantially misaligned. The circular medium is rotatably disposed within the inner shell. The disk access opening in the outer shell and the inner shell are substantially wedge shaped.

The cartridge further comprises a latch disposed within the outer shell for locking the inner shutter shell in a closed position. The latch has an actuating point along a peripheral edge of said cartridge that unlocks the shutter shell when pressed. Preferably, the latch is disposed on a side peripheral edge of the cartridge and the actuating point is either recessed in a latch window in the outer shell or extends outwardly from the peripheral edge of the cartridge.

The data storage device preferably comprises a lever coupled to a base of the data storage device for operating the cartridge latch. The lever has a cartridge engagement portion disposed on a distal end thereof and comprises a spring portion that flexes during operational use. Preferably, the spring portion comprises a flexible shaft and aligned lengthwise along a length of the data storage device.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides a data storage cartridge for use with a removable media type of disk drive. Throughout the description, a preferred embodiment of the invention is described in connection with a particular sized and shaped disk cartridge. However, many aspects of the disk cartridge shape are presented for exemplary purposes only. Accordingly, the mechanism should not be limited to the particular cartridge embodiment shown as the invention contemplates the application to other cartridge and drive types and configurations.

Figure 1:
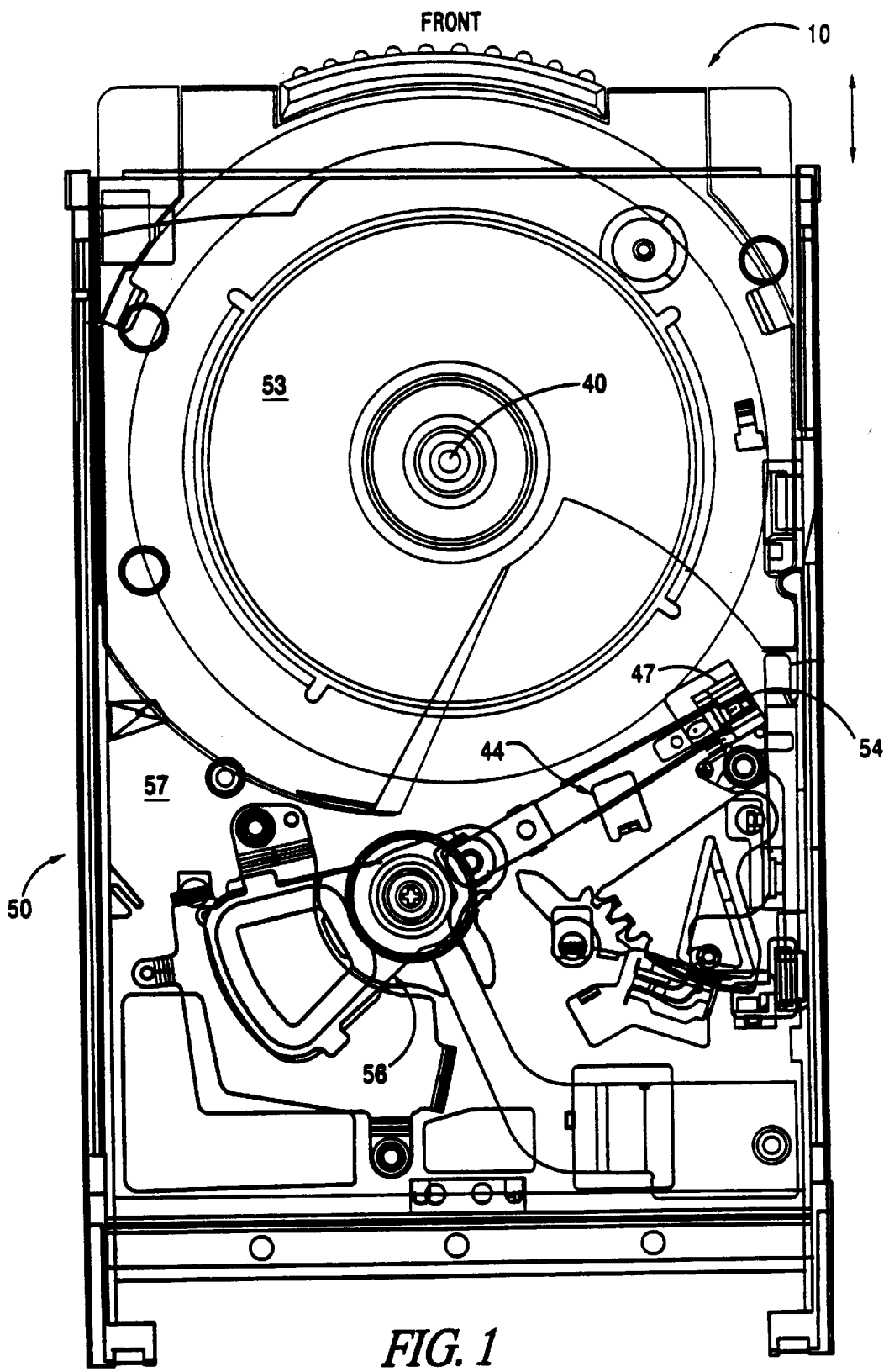
FIG. 1 is a top plan view of a disk drive according to the present invention.

FIG. 1 is a top view of a disk drive 50 with its top cover removed for clarity. Drive 50 accepts a removable disk cartridge 10 (shown in phantom) for reading and storing digital information. Drive 50 comprises a chassis 57, an actuator 56, including an opposing pair of load beams 44 having a read/write head 54 disposed at the end of each load beam, a load ramp 47, a spindle motor 53 and a spindle 40. A disk cartridge 10 can be inserted into the front of the drive in the direction indicated by the arrow. During insertion, cartridge 10 slides linearly along the top surface of chassis 57 and spindle motor 53 for engagement with the read/write heads 54.

FIGS. 2–5 show the exterior features of disk cartridge 10 in further detail. As shown, disk cartridge 10 has a somewhat angular main body 10b, an arcuate front portion 10a, and an arcuate rear portion 10c. Cartridge 10 comprises an outer shell 18 and inner shutter shell 16. The shutter shell 16 rotates within outer shell 18 to selectively expose media 14 by way of a large wedge-shaped disk access opening 418, disposed in the front portion of disk cartridge 10. Disk cartridge 10 also comprises a flexible magnetic disk 14 (shown in phantom in FIG. 3) and a disk media hub 12 that is attached to media 14 both of which are rotatably disposed within cartridge 10. A driving access hole 218b provides an opening in cartridge 10 for drive spindle 40 (see FIG. 1) to engage hub 12 and drive flexible disk 14 over opposing read write heads 54 (also shown in FIG. 1). Hub 12 is sized smaller than driving hole 218b and projects downwardly from cartridge 10. Disk cartridge 10 also comprises a projection 17, coupled to shutter shell 16. that travels along projection track 35 of cartridge 10 by which shutter shell 16 is opened. A latch mechanism 37 that is accessible through latch window 48 keeps shutter 16 locked in a closed position when the cartridge is not in use.

Figure 2:
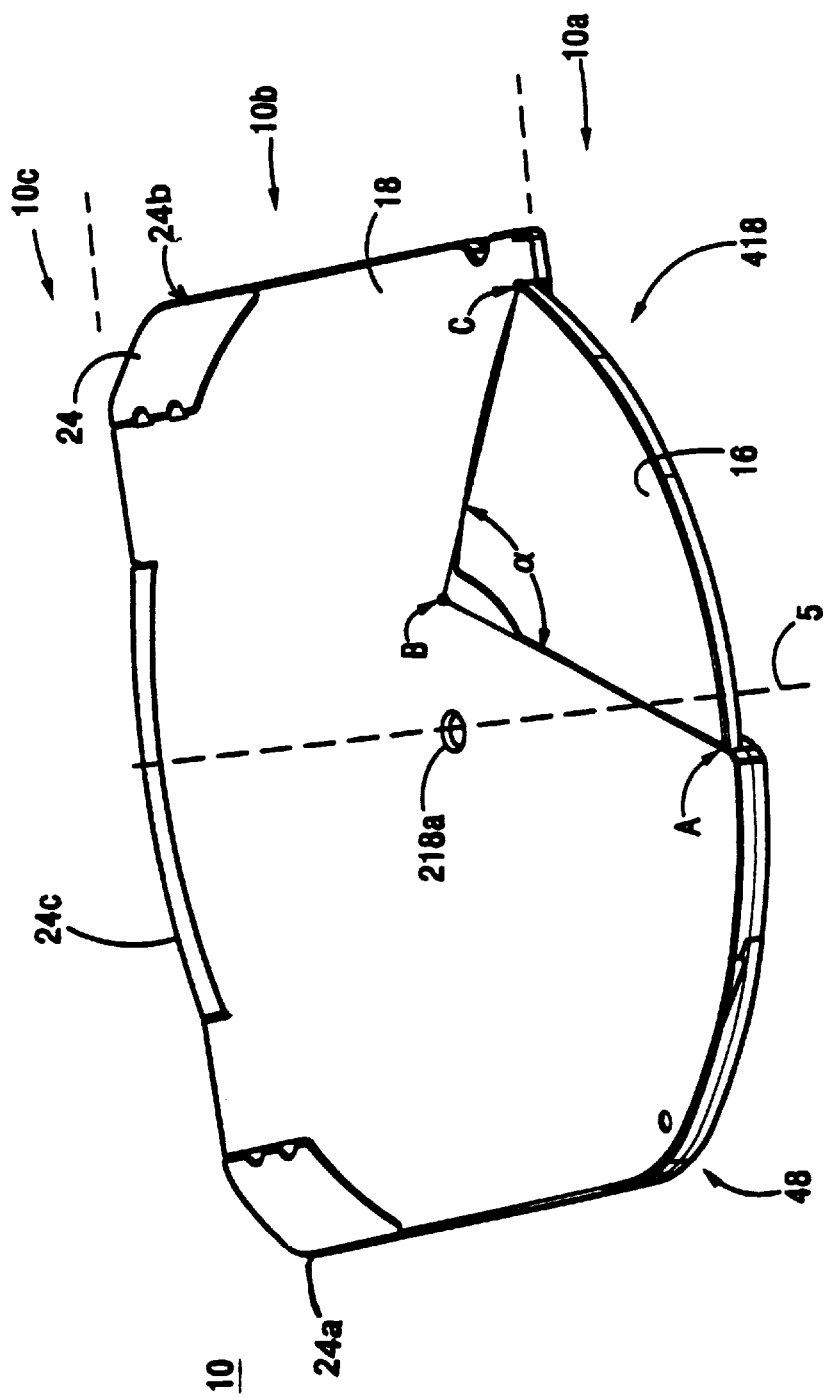
FIG. 2 is an top isometric view of a cartridge for use with the drive of FIG. 1.

As best shown in FIG. 2, wedge-shaped disk access opening 418 is formed in a front portion of cartridge 10 (proximately defined by the points A, B, C), proximate one corner thereof. The opening 418 extends over an arc a between the vectors A-B and B-C. The arc α is preferably less than about 90 degrees and is most preferably about 80 degrees. Accordingly, shutter shell 16 rotates within outer shell 18 starting from proximately point A to proximately point C over an approximately 80 degree arc. Notably, the point A, defines portion of the wedge-shaped opening just past bisecting line 5. Because the shutter rotates over an approximate 80 degree arc, about 15 to 25 percent, preferably about 22 percent, of the edge of media 14 is exposed when the shutter is open. At the same time, approximately 15 to 25 percent of the magnetic disk 14 surface area is exposed. The exposure afforded by the large wedge-shaped opening 418 provides read/write heads 54 with greater access to the media 14 surface and enables the use of a rotary actuator design.

Figure 6:
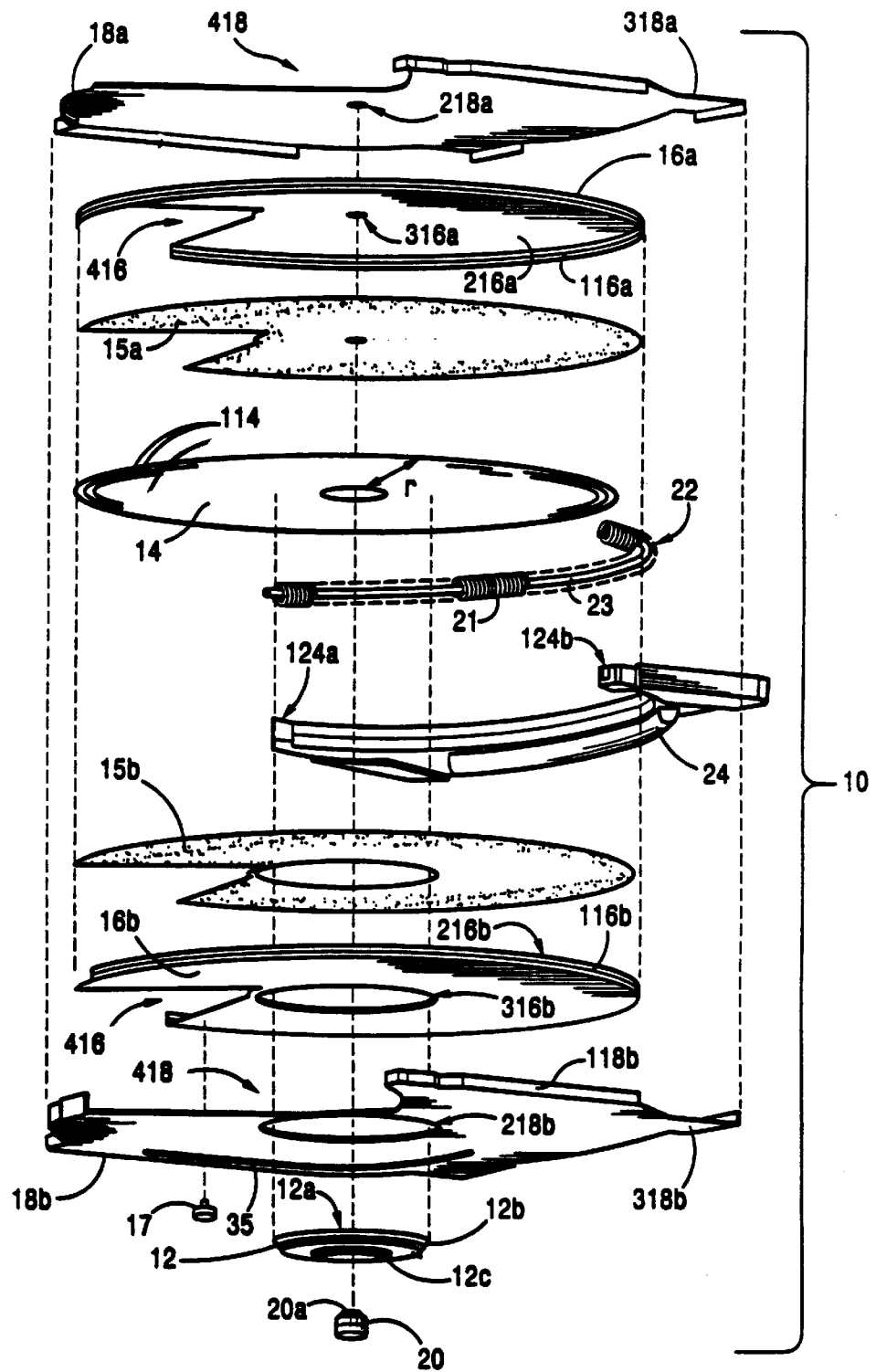
FIG. 6 is an exploded view of the cartridge of FIG. 2.

Referring also to FIG. 6, an exploded view of cartridge 10 is provided to more clearly show cartridge 10 interior components. Cartridge 10 comprises top and bottom cartridge shell halves 18a and 18b, respectively, a rotary shutter shell having upper and lower halves 16a and 16b, respectively, upper and lower shutter shell liners 15a and 15b, respectively, a shutter pivot post 20, a shutter spring mechanism 22, and a shell stabilizer 24. Projection 17 is coupled to bottom shutter shell half 16b.

Liners 15a and 15b are attached to shutter shell halves 16a and 16b. Liner 15a is attached to inside surface 216a of shutter shell half 16a; whereas liner 15b is attached to inside surface 216b of shutter shell half 16b. Disk media 14 rotates within the shutter shell and not directly within the cartridge shell. Accordingly, unlike other known cartridges wherein the liners are typically attached to the inside of the cartridge shell, liners 15a, 15b are attached to the inside surface of shutter shells 16a, 16b. Liners 15a and 15b are preferably attached via an adhesive, more preferably a pressure sensitive adhesive. Liners 15a and 15b are cut to the shape of the surface to which they will be attached (i.e., 216a, 216b) from a sheet of liner material. The liner material is preferably 100% polyester, more preferably Veratec 141-620 available from Data Resources Group in Walpole Mass. The liner material has a thickness preferably in the range of about 3.35 mils to about 3.8 mils, more preferably about 3.35 mils.

Stabilizer 24 is a substantially U-shaped spacer positioned in the rear portion of cartridge 10 and between upper and lower cartridge shell halves 18a and 18b. Rear cartridge shell tabs 318a and 318b extend rearwardly from upper and lower shell halves 18a and 18b and wrap around stabilizer 24. Therefore, when cartridge 10 is assembled, a portion of stabilizer 24 extends into and between the shell halves 18a and 18b and portions of stabilizer 24 protrude from joined upper and lower shell halves 18a and 18b. The protruding portions of stabilizer 24 form portions of the outer contours of cartridge 10. In particular, stabilizer 24 forms cartridge rear corners 24a and 24b and forms rear portion 24c.

Stabilizer 24 is formed of a lightweight rigid material such as plastic. More preferably, stabilizer 24 is formed of high impact polystyrene. It is formed from any one of the well-known plastic forming processes, such as injection molding. Stabilizer 24 provides dimensional stability and rigidity to cartridge 10, thereby minimizing cartridge deformation during mishandling, twisting, and so on.

Shutter spring mechanism 22 comprises a guide wire 23 and a round helical compression spring 21 that is slid over guide wire 23. Shutter spring mechanism 22 is fixed to stabilizer 24 at the ends of guide wire 23. The ends seat in channels 124a and 124b that are formed into the ends of U-shaped stabilizer 24.

Flexible magnetic disk 14 is formed of a thin polymer film, such as MYLAR, and has a thin magnetic layer uniformly dispersed on the top and bottom surfaces thereof. The magnetic layer makes the flexible disk 14 susceptible to magnetic flux and enables the storage of digital data when the disk surface is brought into magnetic communication with a magnetic transducer of the type commonly found in disk drives. Disk 14 is generally circular with a circular hole proximate the center of disk 14. Disk 14 has a radius r in a range of about 20 to 25 mm, and preferably about 23 to 25 mm. Disk 14 has concentric tracks 114 that provide the formatting of disk 14 to store digital information.

Media hub 12 is essentially donut shaped and comprises a ferrous material such as steel, preferably stainless steel. Hub 12 comprises a bore or hole 12a proximate the center, peripheral outer edge 12b and inner ring surface 12c. Inner ring 12c has an outer angled edge and a substantially flat bottom surface. Outer peripheral edge 12b is also angled. Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shutter shell halves 16a, 16b. Hub 12 is disposed in spindle access hole 316b of spindle access opening 218b of lower shutter shell 16b and spindle access hole 218b of lower cartridge shell 18b. As described in further detail below, the protrusion of hub 12 from shutter shell 16 and an cartridge shell 18 enhances coupling to a rotational power source, such as that provided by a drive spindle, when cartridge 10 is within drive 50 and acts a restraint on lateral movement of disk 14 when the cartridge is removed drive 50.

Figure 7:
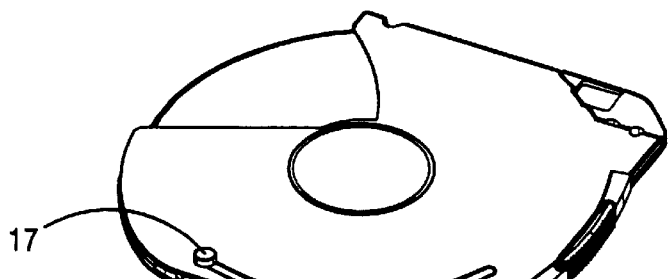
FIG. 7 is a partially exploded view of the cartridge of FIG. 2 showing a shutter latching mechanism.

As shown by FIGS. 6 and 7, shutter halves 16a and 16b fit together such that edge 116a of upper shell half 16a fits within edge 116b of lower shell half 16b to form shutter shell 16, which houses media 14 and shutter liners 15a and 15b (not shown in FIG. 5) which are attached to the inner surfaces of shutter shells 16a and 16b respectively. The complete shutter assembly 16 is pivotally attached to top shell 18a and pivotally disposed in bottom shell 18b. Hub 12 is attached to media 14 and protrudes through drive access hole 316b in bottom shutter shell 16b. Accordingly, when cartridge 10 is inserted and operating in drive 50, media 14 rotates within shutter shell 16. Pivot post 20 attaches the shutter assembly to upper shell half 18a by attaching the top portion 20 to pivot hole 218a via shutter pivot hole 316a. Pivot post 20 is fixedly attached to top shell cartridge 18a while leaving an offset space between and around post portion 20a and shutter pivot hole 316a.

When the shutter assembly is complete, media 14 is exposed at media access opening 416. However, media 14 within cartridge 10 is only accessible from outside of cartridge 10 when shutter access opening 416 aligns with cartridge shell access opening 418. In such an alignment, shutter shell 16 moves to a first position so that the openings 416, 418 completely overlap thereby "opening" cartridge 10. When the cartridge shell access opening 416 and cartridge shell access opening 418 are misaligned, shutter shell 16 moves to a second position such that the openings 416, 418 do not over lap thereby "closing" cartridge 10, shielding media 14 from ambient contaminants.

Significantly, cartridge 10 employs a projection 17 to accommodate the opening of shutter 16 during insertion of cartridge 10 into drive 50. In essence, the projection operates by impinging upon the cartridge insertion opening of drive 50 as cartridge 10 is inserted into drive 50. Because projection 17 extends beyond the general thickness of cartridge 10, projection 17 cannot fit through the narrow drive opening. Accordingly, as a cartridge 10 is forced into drive 50, projection 17 impinges on the frame of drive 50 and thereby drags shutter 16 to an open position.

As noted above, projection 17 is coupled to shutter shell 16. Projection 17 could be formed integrally into shutter 16 but is preferably attached to shutter shell 16 as a separate part such as by welding. Preferably projection 17 forms a substantially round cross-section and is formed of a material to provide wear resistance such as metal. Projection 17 extends downwardly from shutter shell 16 so as to extend through cartridge shell 18 and projection track 35, which is cut into shell 18. When cartridge 10 is in the closed position, compression spring 21 biases shutter 16 toward the closed position and moves projection 17 to the forward most position in projection track 35, as shown for example in FIG. 2. To open cartridge 10, a counterclockwise rotational force is applied to shutter shell 16 (from the bottom cartridge perspective of FIG. 2) against the bias of spring 21, thereby compressing spring 21. Accordingly, projection 17 travels to the rearmost portion of projection track 35, thereby opening shutter 16.

Figure 3:
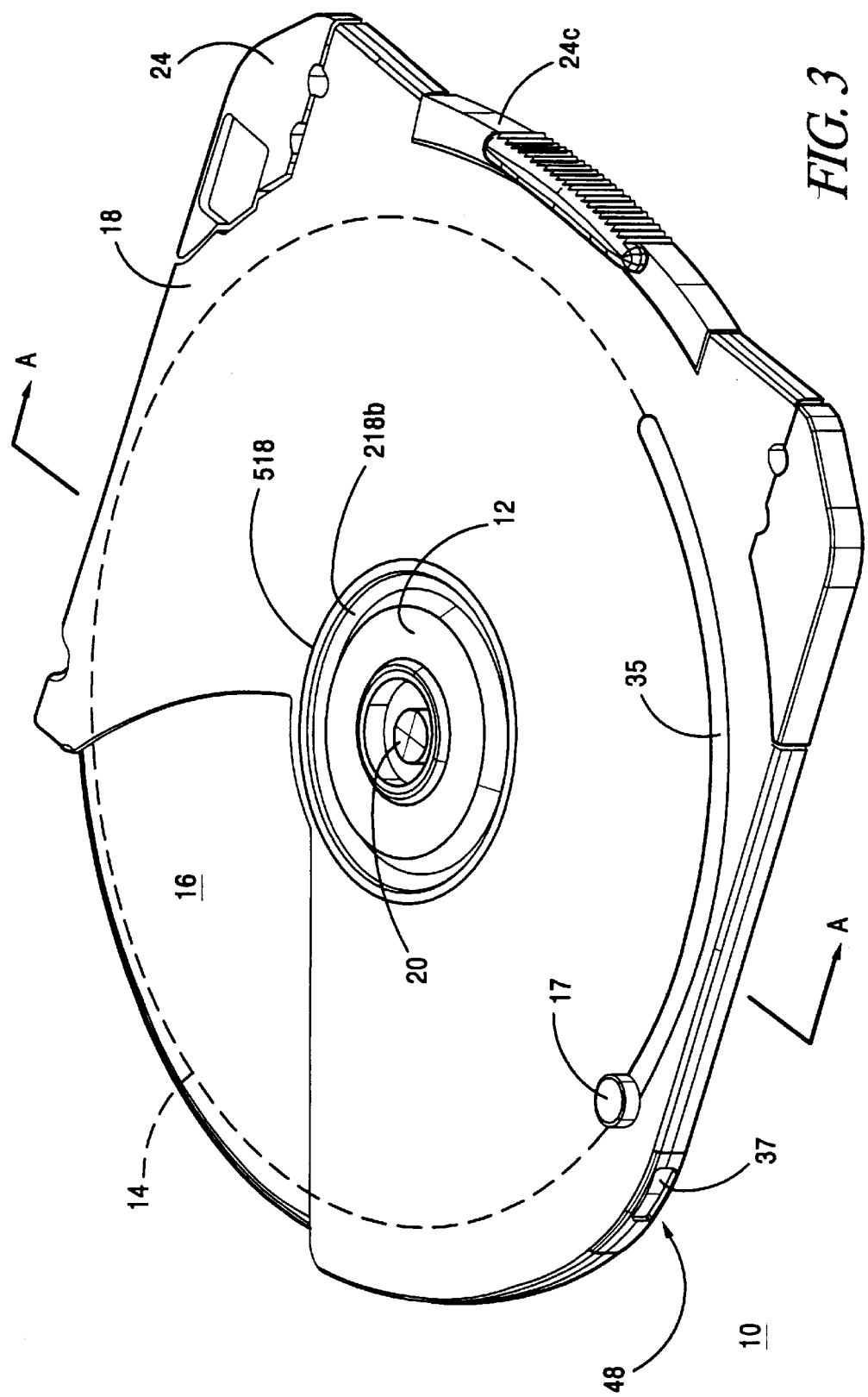
FIG. 3 is a bottom isometric view of a cartridge for use with the drive of FIG. 1.
Figure 5:
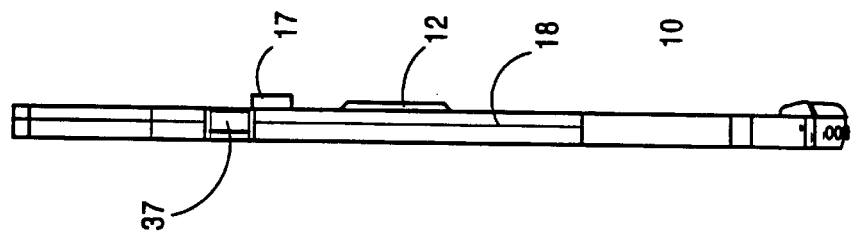
FIG. 5 is a side elevation view of the cartridge of FIG. 2.
Figure 4:
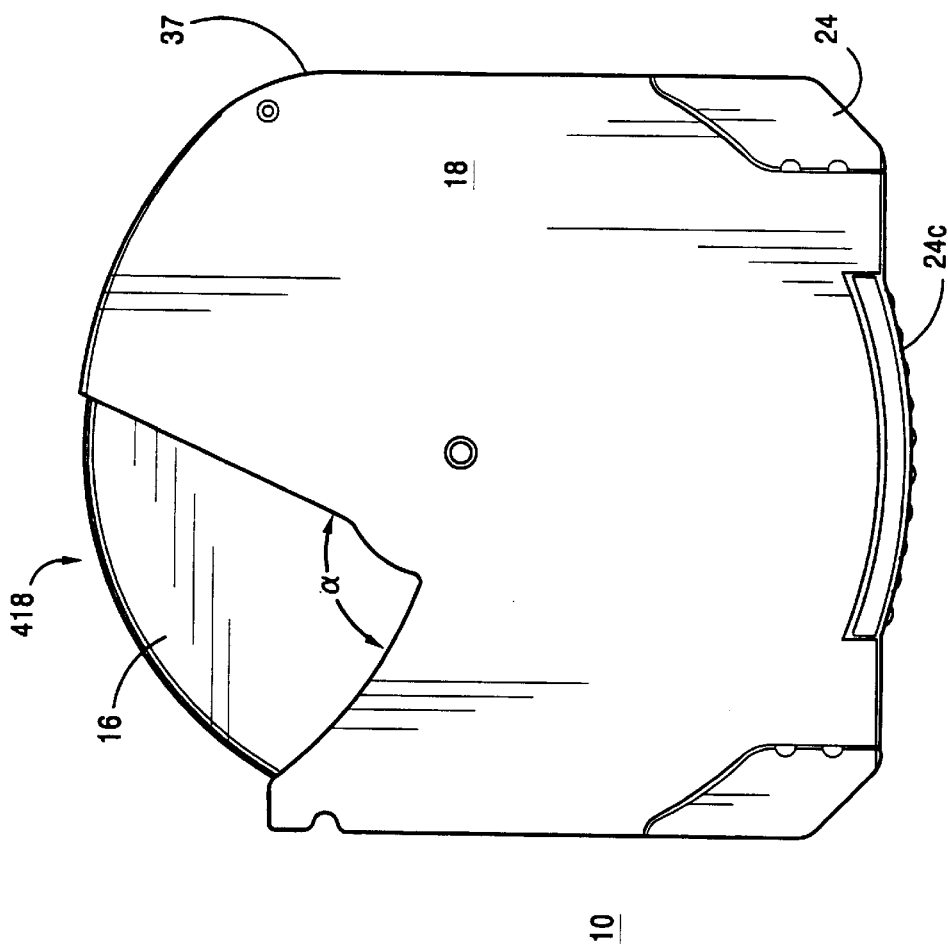
FIG. 4 is a top plan view of the cartridge of FIG. 2.
Figure 8:
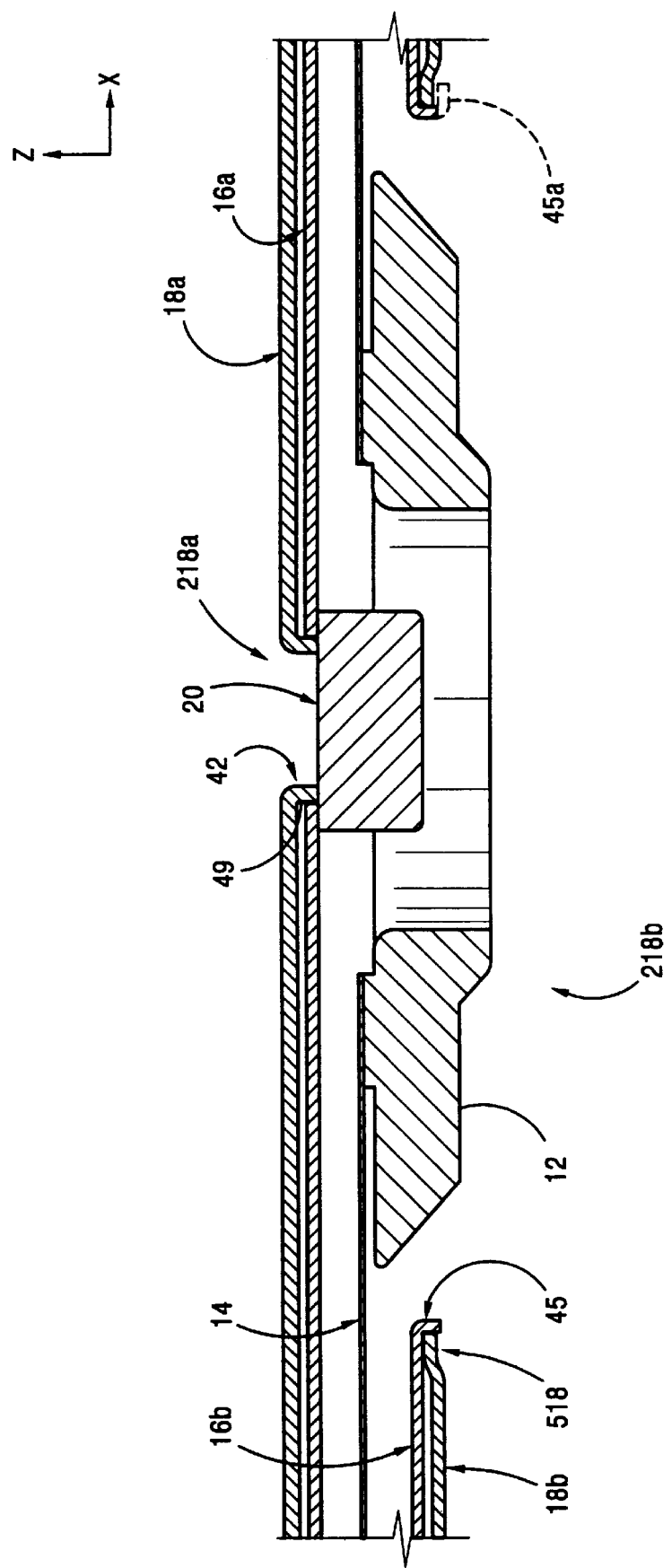
FIG. 8 shows a cross-section of the cartridge of FIG. 3 taken along the line A—A.

FIG. 8 is a cross section of disk cartridge 10 taken along line A—A of FIG. 3 showing a detailed arrangement of the interior components of disk cartridge 10. FIG. 8 also illustrates an attachment of post 20 to top shell 18a as an alternative to the embodiment of FIG. 6. In the embodiment of FIG. 8, top outer shell 18a has a raised rim 42 that extends into the interior of disk cartridge 10. Post 20 is attached to the distal end of raised rim portion 42, leaving a space 49 into which the top shutter shell 16b is rotatably disposed. Space 49 also can be created by forming post 20 with a smaller diameter portion 20a and attaching the portion 20a directly to the interior of top outer cartridge 18a, as shown in FIG. 6.

As noted above, bottom shutter shell portion 16b is rotatably disposed in bottom outer shell 18b. Rotational alignment of shutter shell 16 is further provided by raised portion 45. To that end, annular raised portion 45 projects into spindle access opening 218. An annular depression 518 (as view from the exterior of the cartridge) is formed in bottom shell 18b around spindle access opening 218.

Alternative embodiments of raised portion 45 could be employed. For example, although raised portion 45 is shown projecting straight into spindle access hole 218, the end of raised portion 45 could wrap around the bottom shell 18b, as indicated by phantom portion 45a. Additionally, raised portion 45 is not necessarily continuous, but could also be formed as a plurality of fingers projecting into opening 218b. Moreover, portion 45 could be formed integrally, as shown, or attached to shutter shell 16 as a separate component. In each embodiment, the raised portion 45 provides rotational alignment of shutter shell 16.

Figure 7A:
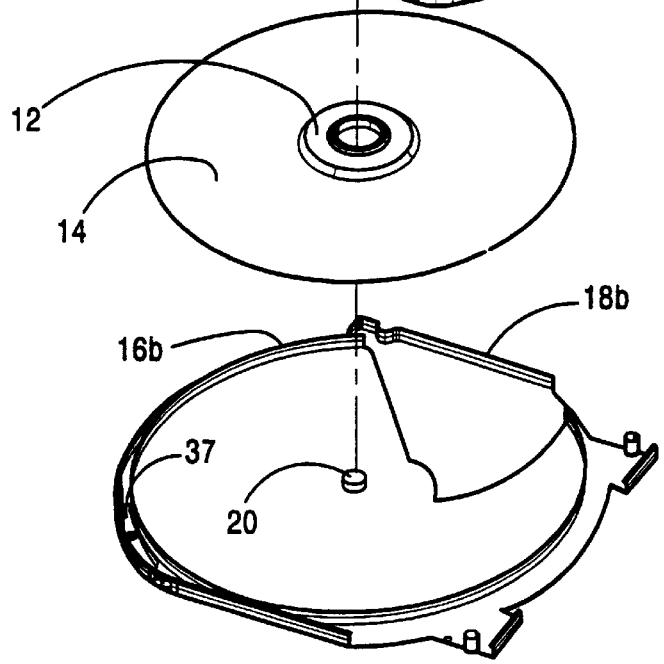
FIG. 7A is a detailed view of an embodiment of the latch of FIG. 7.
Figure 7A:
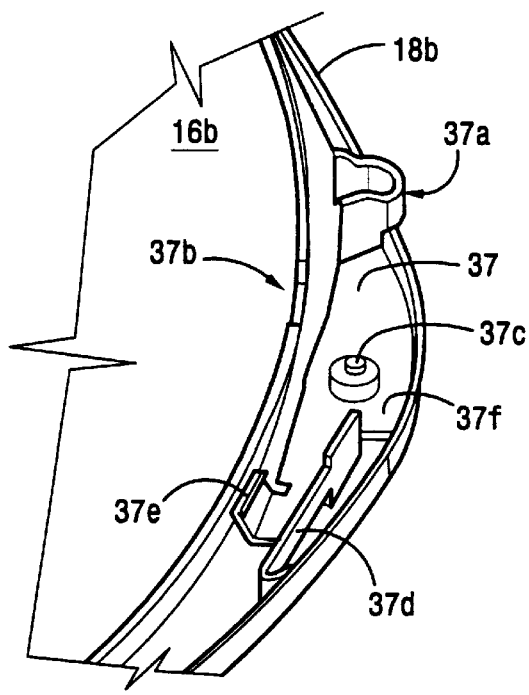
Figure 7B:
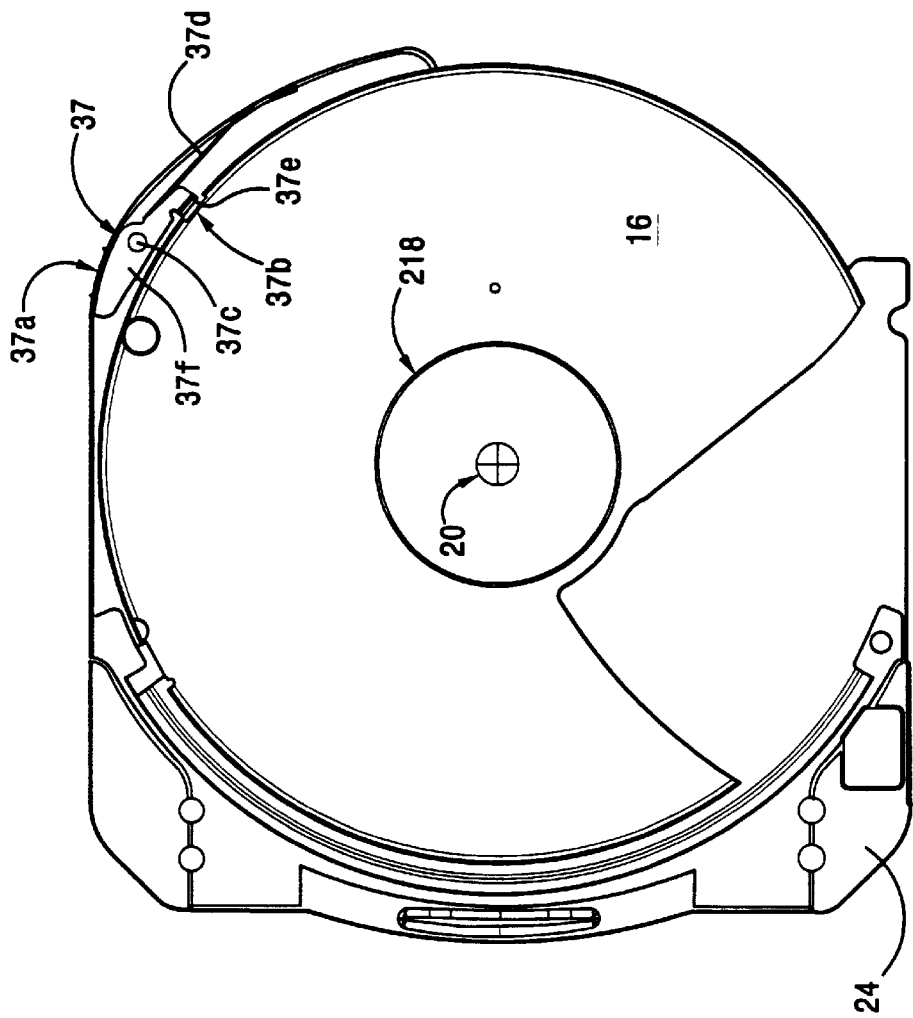
FIG. 7B is a detailed view of another embodiment of the latch of FIG. 7.

Referring to FIGS. 7, 7A, and 7B, the latch operation of shutter 16 is illustrated. As described more fully below, two embodiments are contemplated for shutter latch 37. In the embodiment of FIG. 7A, shutter latch 37 extends outwardly from the cartridge and operates by engaging a frame or stationary portion of drive 50. Alternatively, in the embodiment of FIG. 7B, shutter latch 37 is recessed into cartridge 10 and unlatches by engaging a lever or the like in drive 50.

FIG. 7 shows an exploded view of cartridge 10 that exposes shutter latch 37. FIGS. 7A and 7B show detailed views of the portion of cartridge 10 including shutter latch 37. As shown, shutter latch 37 comprises a main lever body 37f. Coupled to the body are actuating point 37a, pivot 37c, spring 37d, and tab 37e. Shutter bottom 16b has a cut-out 37b that accommodates tab 37e. When shutter 16 is in the closed position, tab 37e engages shutter cut-out 37b and thereby latches shutter 16 to prevent rotation. On the other hand, when actuating point 37a is depressed, such as by inserting cartridge 10 into drive 50, lever 37f is forced to pivot about pivot 37c. Accordingly, the pivot movement of latch 37 causes tab 37e to move out of cut-out 37b thereby releasing shutter 16 from latch 37. Spring 37d causes lever 37f to pivot back when the pressure is removed from actuating point 37a. Accordingly, when cut-out 37b is aligned with tab 37e, spring 37d biases tab 37e into cut-out 37b.

Referring in particular to FIG. 7A, shutter latch 37 is sized such that a portion 37a extends beyond the width of shell 18 so that it extends outwardly from the edge of cartridge 10. Hence, when a cartridge 10 is inserted into drive 50, latch 37 impinges upon the drive frame and is compressed thereby. That is, in order for cartridge 10 to fit through the opening an into drive 50, latch 37 is necessarily pinched an latch 37 is released thereby.

Figure 9A:
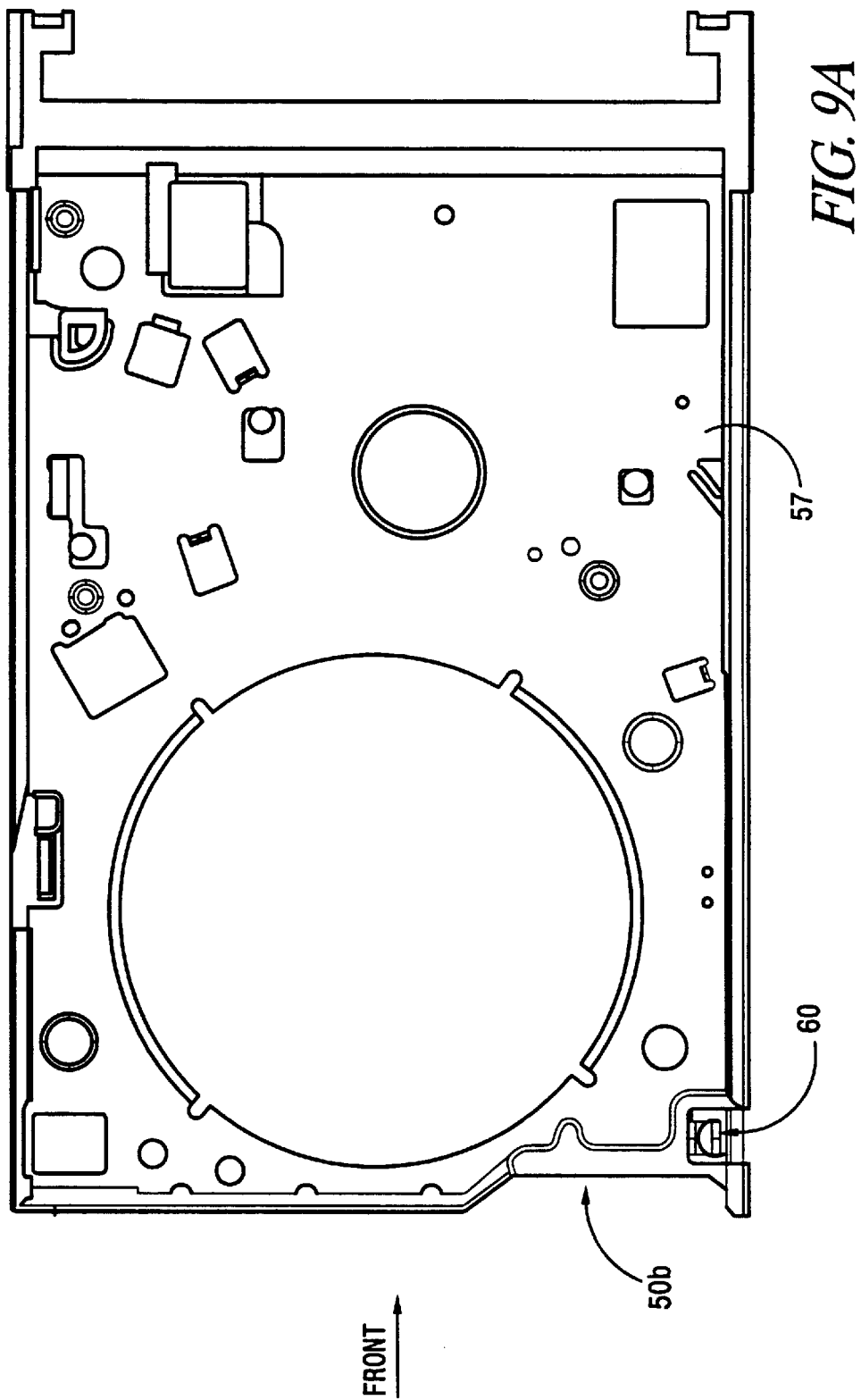
FIGS. 9A–9C show the lever for unlatching the shutter of the cartridge of the present invention.
Figure 9C:
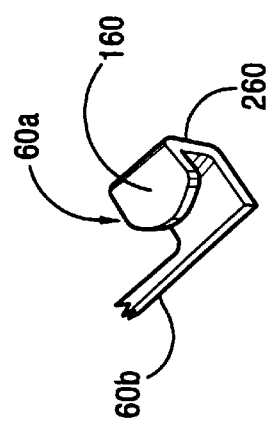
Figure 9B:
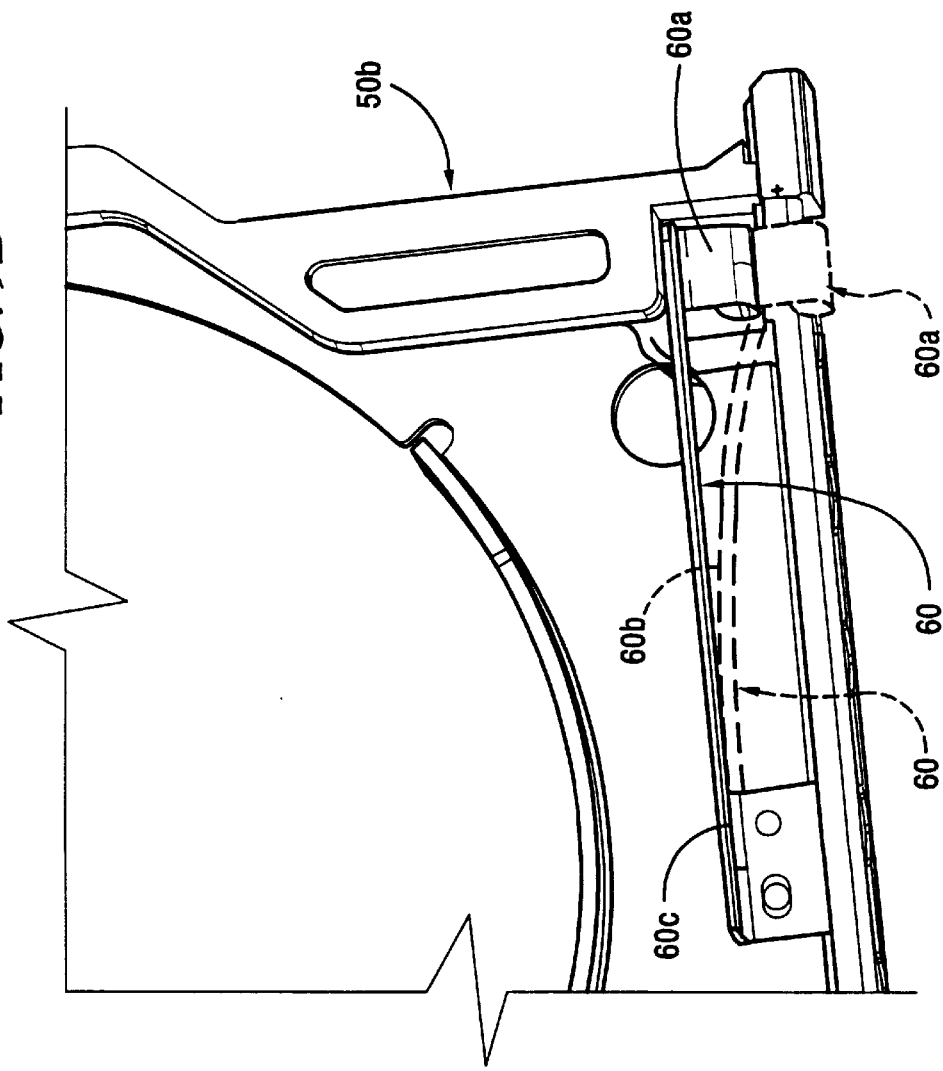

FIGS. 9A and 9B show the mechanism in drive 50 adapted to engage and release shutter latch 37, preferably when the latch is recessed according to the embodiment of FIG. 7B. FIG. 9A is a top plan view of chassis 57 of drive 50 (components are not shown for clarity). Releasing lever 60 is shown proximate a front corner of chassis 57. FIG. 9B is a bottom isometric view of the corner of chassis 60 wherein releasing lever 60 is disposed. Releasing lever 60 comprises a spring portion 60b, which is fixed to chassis 57 at block 60c, and an engagement portion 60a at the distal end of spring 60b. FIG. 9C shows the engagement portion 60a in further detail. Engagement portion 60a comprises a release finger 160 that projects from upstanding portion 260. Release finger 160 comprises rounded corners.

Releasing lever 60 operates as a cartridge 10 is inserted into drive 50. As a cartridge 10 is inserted into drive 50, release finger 160 engages shutter latch 37 thereby permitting shutter 16 to rotate within disk cartridge 10. As cartridge 10 is urged further into drive 50, engagement portion 60a is urged outwardly (as indicated in phantom in FIG. 9B) as release finger 160 rides out of latch 37 and along the edge of cartridge 10. Simultaneously, spring portion 60b flexes to accommodate outward movement of engagement portion 60a. Additionally, the rounded corners of release finger 160 enable ease of transition of finger 160 into and out of engagement with latch 37. When cartridge 10 is removed from drive 50, spring portion 60b returns to its initial rest condition and in position to again engage a cartridge 10 as it is inserted into drive 50.

As an alternative to the use of lever 60 to release latch 37, latch 37 protrudes from cartridge 10 and is released by passive engagement with the frame of drive 50. Referring to FIGS. 10A–10F, the operation of the alternative latch embodiment is further illustrated. In general, as cartridge 10 is inserted into drive 50, latch actuating point 37a impinges on the side rails 51 of drive 50. The impingement causes the tab of latch 37 release from shutter 16 thereby freeing the shutter to rotate. Somewhat simultaneously, projection 17 impinges on the opening of drive 50 proximate the stepped portion 50b. As cartridge 10 is urged further into drive 50, projection 17 moves along projection track 35 with respect to the cartridge and along the face of step 50b with respect to drive 50. Accordingly, shutter 16 is opened for drive access to media 14 of cartridge 10.

Figure 10A:
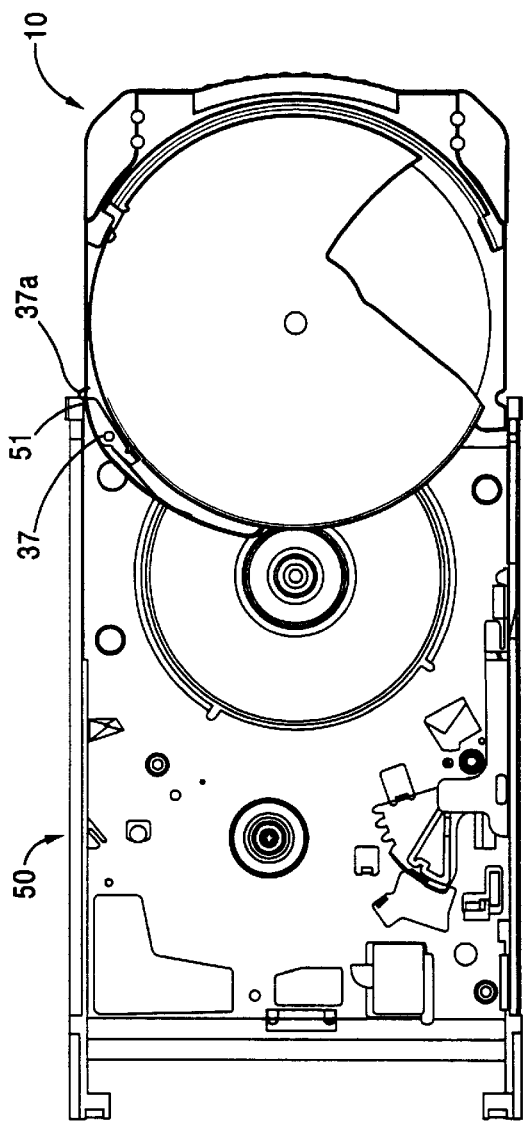
FIGS. 10A–10F illustrate the operation of shutter shell 16 in conjunction with the drive of FIG. 1.
Figure 10B:
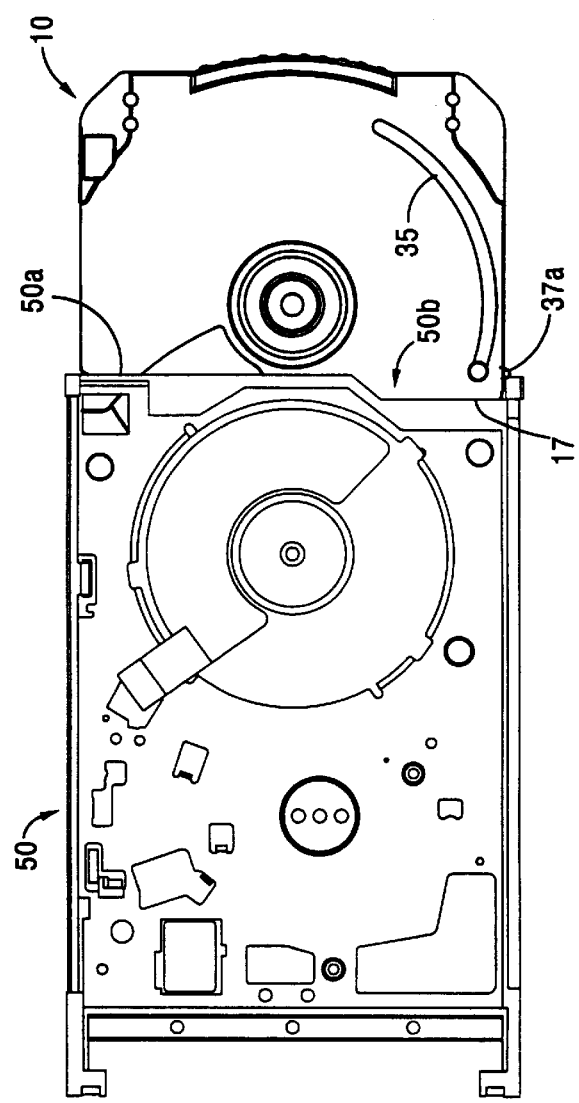

Referring to FIGS. 10A and 10B, a top and bottom plan view of cartridge 10 and drive 50 are shown with cartridge 10 partially inserted into drive 50. The top shell 18a has been removed to further illustrate the operation of latch 37. Furthermore, in FIGS. 10A and 10B, cartridge 10 is inserted into drive 50 just to the point that actuating point 37a is proximate the front of drive 50. As the cartridge is inserted further into drive 50, actuating point 37a engages side rail 51 of drive 50, thereby unlatching shutter shell 16 and allowing it to rotate freely. The front frame 50a of drive 50 has a stepped portion 50b so that projection 17 has not yet engaged the front frame 50a.

Figure 10C:
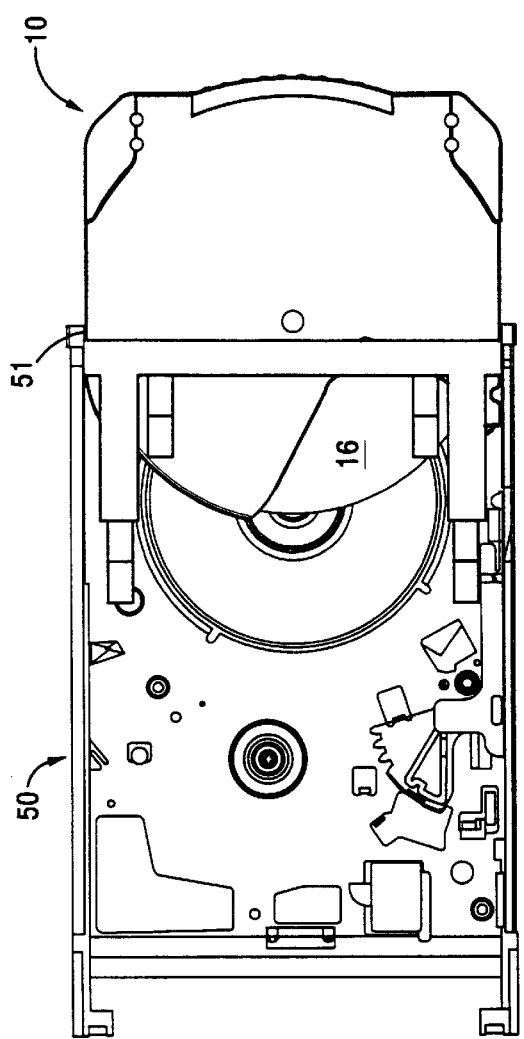
Figure 10D:
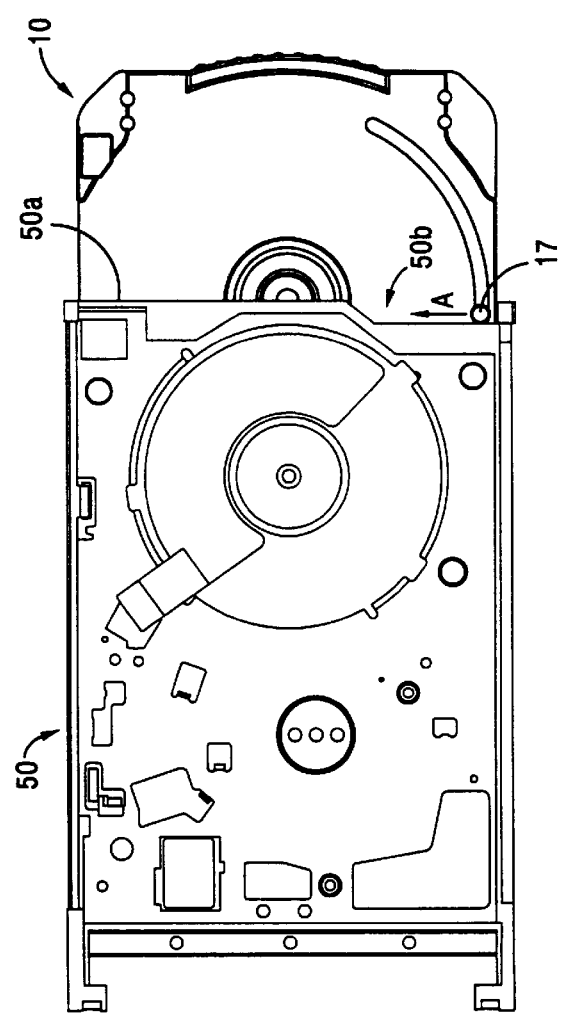

Referring next to FIGS. 10C and 10D, top and bottom plan views further illustrate the operation of shutter 16 in a more fully inserted position. In these Figures, projection 17 has engaged the front frame 50a proximate the stepped portion 50b. As cartridge 10 is urged further into drive 50. Frame front 50a urges projection 17 to rotate shutter 16 toward the open position. Consequently, projection 17 slides across the stepped portion 50b in the direction of arrow "A" as cartridge 10 further enters drive 50.

Figure 10E:
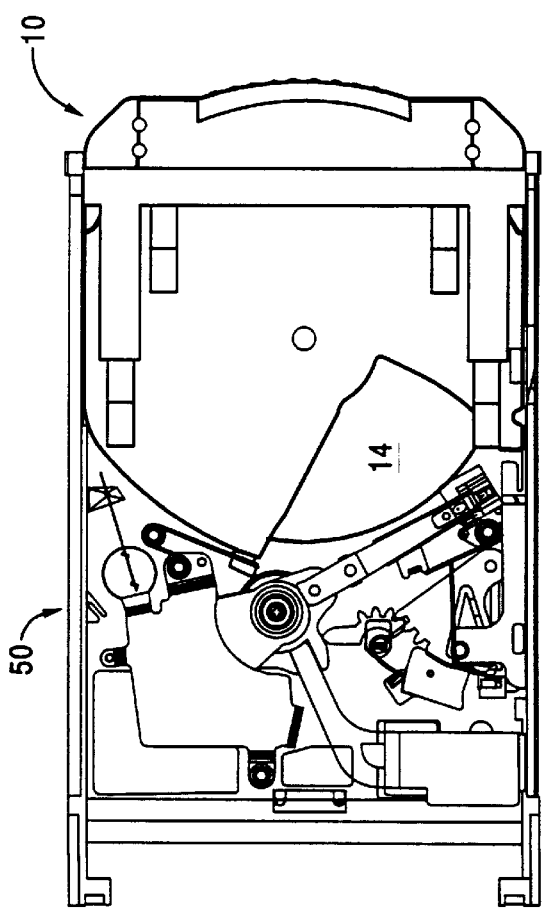
Figure 10F:
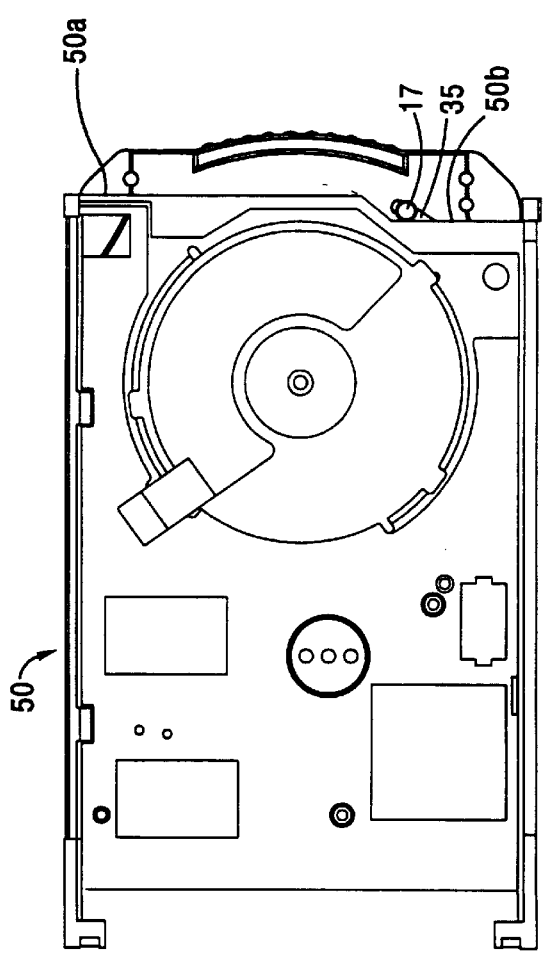

Finally, as illustrated in top and bottom plan views of FIGS. 10E and 10F, as cartridge 10 is urged fully into drive 50, projection 17 has moved rearwardly in projection track 35 and across the stepped portion 50b of front frame 50a. Consequently, shutter 16 is rotated to the fully open position and is ready for the loading of the read/write heads.

The operation of shutter 16 during cartridge ejection is essentially the reverse sequence from that described above in connection with FIGS. 10A–10F. However, the ejection of cartridge 10 from drive 50 is aided by spring 21 of cartridge 10. In particular, as cartridge 10 ejects from drive 50, the force of spring 21 rotates shutter 16 in the clockwise direction. The force of spring 21 causes projection 17 to impinge upon the front frame 50a. This force also causes cartridge 10 to move outwardly from drive 10. Of course, this force to move the cartridge outwardly diminishes as the moves outwardly from drive 50. When the cartridge moves proximately out of drive 50, shutter 16 should is rotated to the closed position. At this moment, latch 37 latches shutter 16 to the closed position as actuating point 37a clears drive rails 51.

The above description of preferred embodiments is not intended to impliedly limit the scope of protection of the following claims. Thus, for example, except where they are expressly so limited, the following claims are not limited to applications involving cartridges for disk drive systems.

What is claimed is:

1. A data storage cartridge for use in a cartridge reading device comprising:
    an outer shell having a disk access opening therein, said outer shell having first and second substantially parallel peripheral side edges and a front peripheral edge formed between said side edges, said peripheral side edges being substantially parallel to a direction of insertion of said cartridge into the cartridge reading device;
    a flexible magnetic medium disposed within said outer shell;
    a shutter shell rotatably disposed within said outer shell, and
    a latch disposed within said outer shell for locking said shutter shell in a closed position, said latch having an actuating surface accessible along at least a portion of one of said first and second peripheral side edges of said cartridge proximate a transition between one of said first and second peripheral side edges and said front peripheral edge.

2. The data storage cartridge as recited in claim 1 wherein said latch actuating surface is disposed on one of said first and second peripheral side edges of said cartridge.

3. The data storage cartridge as recited in claim 1 wherein said outer shell comprises a latch window and wherein said actuating surface is accessible in said latch window.

4. The data storage cartridge as recited in claim 1 wherein said actuating surface extends outwardly from a peripheral edge of said cartridge.

5. The data storage cartridge as recited in claim 1 wherein said cartridge is about 2 inches wide.

6. The data storage cartridge as recited in claim 1 wherein said cartridge comprises a substantially arcuate front portion.

7. The data storage cartridge as recited in claim 1 wherein said cartridge comprises a wedge-shaped disk access opening.

8. A cartridge for use with a data storage drive comprising:
    an outer shell having a wedge-shaped disk access opening, said outer shell having a front peripheral edge, and first and second side peripheral edges, said first and second side peripheral edges being substantially parallel to a direction of insertion of said cartridge into said data storage drive, a width between said first and second side peripheral edges being about 2 inches;
    a flexible magnetic medium disposed within said outer shell;
    a shutter member rotatably disposed within said outer shell; and
    a latch member disposed within said outer shell and having a tab portion that engages said shutter member and an actuating surface accessible from outside of said outer shell for disengaging said tab portion from said shutter member, said actuating surface being accessible along at least a portion of one of said first and second side peripheral edges.

9. The cartridge as recited in claim 8 wherein said latch member comprises a pivot point by which said latch member is pivotally attached to said cartridge.

10. The cartridge as recited in claim 8 wherein said actuating surface is accessible along one of said side peripheral edges of said outer shell.

11. The cartridge as recited in claim 8 wherein said actuating surface is recessed within said outer shell.

12. The cartridge as recited in claim 8 wherein said actuating surface extends out from one of said side peripheral edges of said cartridge.

13. The cartridge as recited in claim 11, wherein said outer shell comprises a window in an outer peripheral edge, said actuating surface being accessible by way of said window.

14. The cartridge as recited in claim 8 wherein said wedge-shaped disk access opening extends in an arc from one of said first and second side peripheral edges proximate a center line of said outer shell and wherein said actuating surface is disposed proximate the other one of said first and second side peripheral edges.

15. The cartridge as recited in claim 14 wherein said cartridge further comprises top and bottom planar surfaces and a shutter opening projection that extends from one of said planar surfaces.

16. The cartridge as recited in claim 15 wherein said outer shell comprises an arcuate path such that said shutter opening projection projects from said shutter member and outwardly from said outer shell by way of said arcuate path.

17. A cartridge for use in a disk drive, comprising, an outer shell having a front peripheral edge and two side peripheral edges, said side peripheral edges being substantially parallel to a direction of insertion of said cartridge into said disk drive;

a data storage medium rotatably disposed within said outer shell and accessible by way of a substantially wedge-shaped opening formed in said outer shell and extending from one of said two side peripheral edges;

a shutter shell rotatably disposed within said outer shell, said shutter shell moving between a closed position and an open position for selectively exposing said data storage medium in said wedge-shaped opening; and a shutter latch means for locking said shutter shell in said closed position, said shutter latch means releasing said shutter shell when a force is exerted against an actuating surface of said latch means, said actuating surface being accessible from one of said two side peripheral edges.

18. The cartridge as recited in claim 17 wherein said actuating surface is recessed within said outer shell.

19. The cartridge as recited in claim 17 wherein said actuating surface extends out from one of said two side peripheral edges of said cartridge.

20. The cartridge as recited in claim 18, wherein said outer shell comprises a window in an outer peripheral edge, said actuating surface being accessible by way of said window.

21. The cartridge as recited in claim 17 wherein said wedge-shaped opening extends in an arc from one of said two side peripheral edges proximate a center line of said outer shell and wherein said actuating surface is disposed proximate the other one of said two side peripheral edges.

22. The cartridge as recited in claim 17 wherein said cartridge further comprises top and bottom planar surfaces and a shutter opening projection that extends from one of said planar surfaces.

23. The cartridge as recited in claim 22 wherein said outer shell comprises an arcuate path such that said shutter opening projection projects from said shutter shell and outwardly from said outer shell by way of said arcuate path.

\* \* \* \* \*